United States Patent Office 3,158,591 Patented Nov. 24, 1964

3,158,591

COPOLYMERS OF EPIHALOHYDRINS AND ETHYLENICALLY UNSATURATED EPOXIDES

Edwin J. Vandenberg, Wilmington, Del., assignor to Hercules Powder Company, Wilmington, Del., a corporation of Delaware No Drawing. Filed Jan. 26, 1960, Ser. No. 4,594
12 Claims. (Cl. 260—88.3)

This invention relates to new polymeric epoxides, and more particularly, to copolymers of epihalohydrins with ethylenically unsaturated epoxides.

It is well known that epichlorohydrin may be polymerized to low molecular weight homopolymers that are useful as plasticizers, etc. Such polymers have, however, been limited in their usefulness.

Now in accordance with this invention copolymers of epihalohydrins and ethylenically unsaturated epoxides have been discovered. These copolymers are unique in that they are essentially linear polyethers, copolymerization having taken place through the epoxy groups. Hence, they provide two types of loci for cross-linking reactions, the halogen atoms in the epihalohydrin portions of the polymer and the ethylene double bonds in the ethylenically unsaturated epoxide portion of the polymer. As a result, it is possible to vulcanize them with standard sulfur recipes to produce excellent rubbers and, in addition, they may be vulcanized by other cross-linking processes due to the presence of the halogen atom.

The new copolymers of this invention are those produced by the copolymerization of an epihalohydrin with at least one other epoxide, at least one of which contains, in addition to the oxirane ring, an ethylenically unsaturated group. Exemplary of the ethylenically unsaturated epoxides that may be copolymerized with the epihalohydrins to produce the new copolymers of this invention are unsaturated glycidyl ethers, monoepoxides of dienes or polyenes, glycidyl esters, etc. The unsaturated glycidyl ethers that may be copolymerized with the epihalohydrins have the general formula

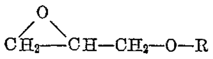

where R is an ethylenically unsaturated radical, as for example, ethylenically unsaturated aliphatic radicals such as vinyl, isopropenyl, allyl, methallyl, butenyl, oleyl, etc., and cycloalkyl or aryl radicals containing an ethylenically unsaturated substituent and cycloalkyl radicals containing an ethylenic double bond in the ring, as for example, 4-vinylcyclohexyl, α-terpinyl, γ-terpinyl, abietyl, cyclohexenylmethyl, o-allylphenyl, p-vinylbenzyl, etc. Exemplary of these ethers are vinyl glycidyl ether, allyl glycidyl ether, vinylcyclohexyl glycidyl ether, o-allylphenyl glycidyl ether, etc.

The monoepoxides of dienes and polyenes that may be copolymerized with epihalohydrins to produce the new copolymers of this invention have the general formula

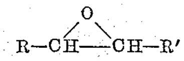

where R is an ethylenically unsaturated radical as defined above and R′ is hydrogen, R, alkyl, cycloalkyl, aryl or alkaryl or R and R′ together with the two carbons of the epoxy group may form a cycloaliphatic ring, e.g.

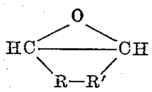

which may itself contain an ethylene double bond or which may be substituted by an ethylenically unsaturated hydrocarbon group such as a vinyl group. Exemplary of the monoepoxides of dienes and polyenes having the above general formula are butadiene monoxide, chloroprene monoxide, 3,4-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinylcyclohexene, 1,2-epoxy-5,9-cyclododecadiene, divinylbenzene monoxide, 5,6-epoxy-1,7-octadiene, etc.

Another class of the ethylenically unsaturated epoxides that may be copolymerized with epihalohydrins to produce the new copolymers of this invention are glycidyl esters which have the general formula

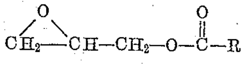

where R is an ethylenically unsaturated radical. Exemplary of such glycidyl esters are glycidyl methacrylate, glycidyl crotonate, glycidyl oleate, glycidyl abietate, etc.

Any epihalohydrin, as for example, epichlorohydrin, epibromohydrin, epifluorohydrin, or mixtures thereof, may be copolymerized with the ethylenically unsaturated epoxides to produce the new polymers of this invention. In addition, other epoxides may also be incorporated in these copolymerizations so that the final copolymer may be a terpolymer, a quaternary polymer, etc. Thus, the copolymers of this invention may include, in addition to the epihalohydrin monomer units and the ethylenically unsaturated epoxide monomer units, other epoxide monomer units, such as those of ethylene oxide, propylene oxide, butene-1 oxide, butene-2 oxides, dodecene-1 oxide, octadecene-1 oxide, cyclohexene oxides, styrene oxide, alkyl glycidyl ethers, phenyl glycidyl ethers, etc.

The copolymers of this invention will then contain at least the following two repeating units

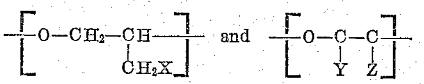

where X is halogen and Y is H, alkyl, aryl or cycloalkyl when Z is —R, $—CH_2—O—R$, or

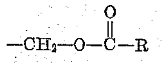

or Y and Z may both be R, or Y and Z together with the carbons to which they are attached may be a cycloaliphatic nucleus which itself contains an ethylene double bond or is in turn substituted with a group R, e.g.

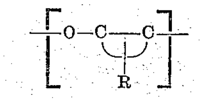

where R in each case is an ethylenically unsaturated radical such as vinyl, isopropenyl, allyl, methallyl, butenyl, oleyl, vinylcyclohexyl, α-terpinyl, abietyl, vinylphenyl, vinylbenzyl, alkylphenyl, etc.

These copolymers contain from about 99.5% to about 5% of epihalohydrin and from about 0.5% to about 95% of the ethylenically unsaturated epoxide monomer and preferably will contain from about 98% to about 40% of the epihalohydrin and from about 2% to about 60% of the ethylenically unsaturated epoxide. Where one or more other epoxide monomers are present, these copolymers will contain at least about 5% and preferably about 40% of epihalohydrin and at least about 0.5% and preferably about 2% of the ethylenically unsaturated epoxide, so that in such terpolymers (or tetrapolymers, etc.) the unique properties of vulcanizability, etc., due to the presence of these monomers will not be lost. The amount will, of course, depend somewhat upon the additional epoxide monomers incorporated. Thus, when ethylene oxide is copolymerized with the epihalohydrin and the ethylenically unsaturated epoxide, in an amount up to about 50% of the total monomers, the copolymer will be essentially water insoluble, and little swollen by water, whereas in an amount above about 50%, the copolymer will be at least partially water soluble or highly swollen by water. Hence, they are of more limited utility even though they are still capable of vulcanization. This is not true for propylene oxide and the higher alkylene oxides, since the copolymers of this invention containing high percentages of, for example, propylene oxide, are still water insoluble and little swollen by water, snappy, tough rubbers, which on vulcanization, yield highly desirable rubbers.

The new polymeric epoxides or polyethers containing both halogen and ethylenic unsaturation of this invention may be prepared by contacting a mixture of an epihalohydrin and epoxide containing ethylenic unsaturation with an organoaluminum compound. Organoaluminum compounds that may be used to catalyze the polymerization are trialkylaluminum compounds, dialkylaluminum halides, monoalkylaluminum dihalides, dialkylaluminum hydrides, dialkylaluminum monoalkoxides and the corresponding cycloalkyl and aryl compounds. These organoaluminum compounds may be reacted with a chelating agent such as acetylacetone, trifluoroacetylacetone, etc., if desired. An effective catalyst may also be produced by reacting these organoaluminum compounds, including the chelated complexes, with from about 0.1 to about 1.5 moles of water and preferably 0.5 to 1 mole of water per mole of the organoaluminum compound.

The polymerization reaction is generally carried out in the presence of an inert, liquid, organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or a hydrocarbon diluent such as n-heptane, cyclohexane, benzene, toluene, etc. The temperature of the polymerization process may be varied over a wide range generally from about −80° C. to about 250° C. and preferably from about −30° C. to about 100° C. and while atmospheric or autogenous pressure is usually used, the pressure may be varied from subatmospheric up to several atmospheres, if desired.

The new epihalohydrin copolymers of this invention are high molecular weight polymers which preferably have a Reduced Specific Viscosity of at least about 0.2, and more preferably at least about 0.5 when measured as a 0.1% solution in α-chloronaphthalene at 100° C., or at least about 0.3 and 0.7, respectively, when measured as a 0.1% solution in cyclohexanone at 50° C.

The following examples illustrate the preparation of the new high molecular weight epihalohydrin copolymers in accordance with this invention. All parts and percentages are by weight unless otherwise indicated.

The molecular weight of the polymers is shown by their Reduced Specific Viscosity (RSV). By the term "Reduced Specific Viscosity" is means the $\eta_{sp}/C$ determined on a 0.1% solution of the polymer in cyclohexanone containing 0.1 g. of the polymer per 100 ml. of solution, at 50° C. or as determined on a 0.1% solution of the polymer in α-chloronaphthalene containing 0.1 g. of the polymer per 100 ml. of solution at 100° C.

EXAMPLE 1

A polymerization vessel in which the air had been replaced with nitrogen was charged with ether, 9.3 parts of epichlorohydrin and 0.7 part of allyl glycidyl ether. After equilibrating at 30° C., a solution of the catalyst was injected. The catalyst solution was prepared by diluting a 0.9 molar solution of triisobutylaluminum in n-heptane to 0.5 molar with ether, adding water in an amount of 0.5 mole of water per mole of aluminum compound and agitating the solution at 30° C. for 16 hours. An amount of this catalyst solution equivalent to 0.8 part of the triisobutylaluminum was then injected in the polymerization mixture. The total diluent amounted to 35 parts and contained 92% ether. After 19 hours at 30° C. the conversion of monomers to polymer was 45%. The ether-insoluble copolymer was separated, washed twice with ether and then purified by slurrying it with a 1% solution of hydrogen chloride in ethanol. It was again collected, washed with methanol until neutral and then with a 0.4% solution of Santonox, i.e., 4,4′-thiobis(6-tert-butyl-m-cresol), in methanol and finally was dried for 16 hours at 50° C. under vacuum. The ether-insoluble polymer so isolated amounted to a 30% conversion based on the total monomers charged and had an RSV of 3.2 in cyclohexanone at 50° C. Chlorine analysis indicated that it contained 6.3% of the allyl glycidyl ether monomer and near infrared showed it to contain 7.3% of the allyl glycidyl ether based on double bond absorption. The ether-soluble copolymer was recovered from the ether filtrate and ether washes by evaporation of the ether. After drying, it was a tacky, soft solid and amounted to 15% conversion of the total polymer.

The ether-insoluble copolymer was readily vulcanized with a standard sulfur recipe. One hundred parts of the copolymer was compounded with 12.5 parts of fast extruding furnace carbon black, 12.5 parts of neutral silica, 2 parts of sulfur, 5 parts of zinc oxide, 2 parts of stearic acid and 2.5 parts of tetramethylthiuram disulfide and then cured at 310° F. for 40 minutes. The vulcanizate so obtained had a tensile strength of 1,180, an ultimate elongation of 95 and Shore hardness (A2) of 65.

EXAMPLE 2

Example 1 was repeated except that the amount of the allyl glycidyl ether was increased to 1.4 parts to 8.6 parts of epichlorohydrin and the polymerization was run for 43 hours at 30° C. A conversion of 53% was obtained. The ether-insoluble polymer was isolated as above. It had an RSV of 0.92 in cyclohexanone at 50° C. and contained 11.8% of the allyl glycidyl ether monomer by near infrared based on double bond absorption. The ether-soluble polymer was recovered as described above. It was a tacky, soft solid and amounted to a conversion of 28% of the total polymeric product.

EXAMPLE 3

A polymerization vessel with a nitrogen atmosphere was charged with ether, 9 parts of epichlorohydrin and 1 part of allyl glycidyl ether. After equilibrating at 30° C., a catalyst solution prepared as described in Example 1, but substituting triethylaluminum for the triisobutylaluminum, was added in an amount equal to 0.45 part of triethylaluminum. The total diluent amounted to 35 parts and contained 95% ether. The reaction mixture was agitated and held at 30° C. for 3 hours after which the polymerization was stopped by adding 4 parts of anhydrous ethanol and the reaction mixture was diluted with 25 parts of ether. It was then washed twice with a 3% aqueous solution of hydrochloric acid, with water until neutral, then with a 2% aqueous sodium bicarbonate solution and finally with water. The ether-insoluble polymer was collected, washed with ether, then with ether containing 0.2% Santonox and dried. There was obtained a 9.5% conversion of a snappy rubberlike material having an RSV of 2.8 in cyclohexanone at 50° C. and was shown to be amorphous by X-ray. Based on chlorine analysis it contained 16.2% allyl glycidyl ether.

The ether-soluble polymer was isolated from the filtrate and washes by concentrating until viscous and then adding 10 volumes of methanol. The methanol-insoluble polymer was collected, washed twice with methanol containing 0.2% Santonox and dried. It was a tacky, snappy rubber and had an RSV of 0.68 in cyclohexanone at 50° C. By near infrared, based on poly(allyl glycidyl ether) as a reference, it was shown to contain 27% of the allyl glycidyl ether comonomer. Based on chlorine analysis it contained 28% allyl glycidyl ether.

EXAMPLE 4

Example 3 was repeated except that in this case the charge consisted of 7 parts of epichlorohydrin and 3 parts of allyl glycidyl ether. After 3 hours at 30° C. the polymerization was stopped as before and the ether-insoluble polymer which amounted to only a trace was separated.

The ether soluble polymer was recovered by combining the ether filtrate and washes, concentrating until viscous, and then precipitating the polymer by adding about 10 volumes of methanol, washing with methanol and then with methanol containing 0.2% Santonox and dried. This ether-soluble, methanol-insoluble, polymer was a very tacky rubber with an RSV of 0.46 in cyclohexanone at 50° C. By near infrared based on double bond absorption it was shown to contain 54% of the allyl glycidyl ether comonomer and by chlorine analysis it contained 52% allyl glycidyl ether.

EXAMPLE 5

A polymerization vessel with a nitrogen atmosphere was charged with 9.8 parts of epichlorohydrin and 0.2 part of allyl glycidyl ether. The polymerization was carried out as described in Example 1 except that the catalyst used was prepared by reacting 0.79 part of triisobutylaluminum with 0.04 part of water, the latter being added stepwise to the alkylaluminum (0.5 mole of water per mole of aluminum) and the catalyst solution was added to the polymerization reaction mixture in eight portions at 15 minute intervals. After 2 hours at 30° C., the total conversion to polymer was 31%. The ether-insoluble copolymer was separated as above and amounted to a conversion of 15%. It was rubbery, had an RSV of 3.5 in cyclohexanone at 50° C., and by near infrared based on allyl group analysis was shown to contain 6.7% of the allyl glycidyl ether monomer. The ether-soluble copolymer was recovered from the ether filtrates and washes by concentration and precipitation with methanol as above. After drying it was a viscous liquid and amounted to 11% conversion.

The rubbery, ether-insoluble epichlorohydrin-allyl glycidyl ether copolymer was cross-linked by compounding on a two-roll mill, 100 parts of the copolymer, 12.5 parts of fast extruding furnace carbon black, 12.5 parts of neutral silica, 2 parts of sulfur, 5 parts of zinc oxide, 2 parts of stearic acid, and 2.5 parts of tetramethylthiuram disulfide and then curing the mixture by heating at 310° F. for 40 minutes. The vulcanizate so obtained had a tensile strength of 2475 p.s.i., a 100%, 200%, 300% and 400% modulus of 315, 580, 935 and 1335 p.s.i., respectively, an ultimate elongation of 640%, and a Shore hardness (A2) of 61.

EXAMPLE 6

Example 1 was repeated except that the charge was 19 parts of epichlorohydrin and 1 part of crude o-allylphenyl glycidyl ether (78% pure by near infrared) and the amount of catalyst used was doubled and added in 4 portions at 30 minute intervals. After 2 hours at 30° C., the ether-insoluble polymer was separated. It was rubbery, had an RSV of 1.2 as measured on a 0.1% solution in α-chloronaphthalene at 100° C. and was obtained in 60% conversion and 95% yield. Near infrared showed the presence of allyl groups in the copolymer.

This copolymer was compounded using the same formula as in Example 5 and cured as there. The vulcanizate had a tensile strength of 960 p.s.i., ultimate elongation of 285%, 100% and 200% modulus of 280 and 595 p.s.i., respectively, and Shore hardness (A2) of 40.

EXAMPLE 7

Example 5 was repeated except that epibromohydrin was used in place of the epichlorohydrin used in that example and the polymerization was run for 4 hours at 30° C. An ether-insoluble, rubbery copolymer was isolated, which on vulcanization, gave a tough vulcanizate.

EXAMPLES 8–15

In these examples various ethylenically unsaturated epoxides were copolymerized with epichlorohydrin using the general procedure described in Example 1. The diluent used in each case was heptane or toluene, and the catalyst used in each case was that prepared by reacting an 0.5 M solution of triethylaluminum in 70:30 n-heptane:diethyl ether with acetylacetone in the cited mole ratio and then with 0.5 mole of water per mole of aluminum. In Table I are set forth the monomers copolymerized and the amount of each, the diluent used and amount thereof, the catalyst and amount thereof expressed as parts of triethylaluminum, the reaction time and temperature, the percent conversion to isolated polymer obtained and the RSV of each polymer determined on an 0.1% solution in (1) α-chloronaphthalene at 100° C., (2) chloroform at 25° C., and (3) benzene at 25° C. The monomers copolymerized are indicated in the table by the following abbreviations:

ECH=Epichlorohydrin
BMO=Butadiene monoxide
EO=Ethylene oxide
PO=Propylene oxide
AGE=Allyl glycidyl ether
VCMO=Vinylcyclohexene monoxide (1,2-epoxy-4-vinylcyclohexane)

The copolymers produced in Examples 8 and 9 were isolated by diluting the reaction mixture with ether, collecting the ether-insoluble polymer, slurrying it with a 1% solution of hydrogen chloride in ethanol, again collecting it and washing it with methanol until neutral and finally with a 0.4% solution of Santonox in methanol, after which it was dried. The copolymer produced in Example 10 was isolated by adding 1–2 volumes of 1% methanolic hydrogen chloride to precipitate the polymer, filtering, washing the polymer first with methanol and then with a 0.2% solution of Santonox in methanol and drying. The copolymers produced in Examples 11, 12, 13 and 15 were isolated by adding 1–5 volumes of n-heptane to precipitate the polymer, filtering and then washing with n-heptane and a 0.2% solution of Santonox in n-heptane and finally drying for 16 hours at 80° C. under vacuum. The copolymer produced in Example 14 was isolated by diluting the reaction mixture with ether, washing it twice with aqueous 3% hydrogen chloride, then with water until neutral and after adding Santonox equal to 0.5% based on the polymer, the diluents were evaporated and the copolymer dried.

*Table I*

| Ex. No. | Diluent | | Monomer | Parts | Catalyst | Parts | Reaction Conditions | Isolated Polymer | |
|---|---|---|---|---|---|---|---|---|---|
| | Total Parts | Components | | | | | | Percent Conv. | RSV |
| 8 | 20 | n-Heptane | ECH<br>BMO | 9.9<br>0.6 | $(C_2H_5)_2AlA \cdot 0.5H_2O$ | 0.45 | 4 hrs., 50° C | 7 | 6.7 (1) |
| 9 | 20 | do | ECH<br>VCMO | 9.9<br>0.6 | $(C_2H_5)_2AlA \cdot 0.5H_2O$ | 0.45 | do | 6.5 | >1.1 (1) |
| 10 | 40 | Toluene | ECH<br>EO<br>AGE | 8<br>1<br>1 | $(C_2H_5)_3Al \cdot 0.5A \cdot 0.5H_2O$ | 0.23 | 27 hrs., 30° C | 12 | 5.4 (1) |
| 11 | 40 | do | ECH<br>EO<br>AGE | 4.4<br>4.6<br>1.0 | $(C_2H_5)_3Al \cdot 0.5A \cdot 0.5H_2O$ | 0.23 | 6 hrs., 30° C | 17 | >1.2 (2) |
| 12 | 40 | do | ECH<br>PO<br>AGE | 4.5<br>4.5<br>1 | $(C_2H_5)_3Al \cdot 0.5A \cdot 0.5H_2O$ | 0.23 | 27 hrs., 30° C | 9 | >11.2 (3) |
| 13 | 40 | do | ECH<br>PO<br>AGE | 8<br>1<br>1 | $(C_2H_5)_3Al \cdot 0.5A \cdot 0.5H_2O$ | 0.23 | do | 15 | 6.9 (1) |
| 14 | 40 | do | ECH<br>PO<br>AGE | 2<br>7<br>1 | $(C_2H_5)_3Al \cdot 0.5A \cdot 0.5H_2O$ | 0.23 | do | 15 | 21.0 (2) |
| 15 | 39 | do | ECH<br>EO<br>PO<br>AGE | 2.9<br>5.1<br>1.0<br>1.0 | $(C_2H_5)_3Al \cdot 0.5A \cdot 0.5H_2O$ | 0.23 | 4 hrs., 30° C | 16 | 11.7 (2) |

A description of the copolymers produced in Examples 8–15 is summarized in Table II along with the physical data on vulcanizates prepared from them. The vulcanization was done by compounding on a two-roll mill (front roll temperature of 175° F., back roll at room temperature) for 5–7 minutes, 100 parts of the polymer with the specified vulcanization formula and then press curing at 310° F. for 40 minutes. The vulcanization formulas used (based on 100 parts of polymer) were

| Formula No. | I | II |
|---|---|---|
| Fast extruding furnace black | 30 | ---------- |
| Sulfur | 2 | 5 |
| Zinc Oxide | 3 | 5 |
| Stearic Acid | 2 | 2 |
| Tetramethylthiuram disulfide | ---------- | 2.5 |
| Mercaptobenzothiazole | 1.5 | ---------- |

The copolymer composition was determined by infrared analysis based on double bond absorption in each case and in Examples 10 and 12 to 14 also by Kemp Bromine Number analysis. The crystallinity of the copolymers was determined by X-ray and is also indicated by their acetone solubility, since the higher the amorphous content, the higher the solubility in acetone.

*Table II*

| Ex. No. | Copolymer composition, percent by weight | Properties of Copolymer | | | | Vulcanization formula | Properties of Vulcanizate | | | | | |
|---|---|---|---|---|---|---|---|---|---|---|---|---|
| | | Description | Crystallinity by X-ray | Water solubility, percent | Acetone solubility, percent | | Tensile strength, p.s.i. | Modulus 300%, p.s.i. | Ultimate elongation, percent | Shore hardness A2 | Percent gel formation | Percent swell (toluene) |
| 8 | ECH:BMO—95:5 | Tough rubber. | ---------- | Insol. | ---------- | II | ---------- | ---------- | ---------- | ---------- | 99 | 185 |
| 9 | ECH:VCMO—99.5:0.5 | do | ---------- | Insol. | ---------- | II | ---------- | ---------- | ---------- | ---------- | 72 | 600 |
| 10 | ECH:EO:AGE—59:34:7 | Snappy rubber. | Amorphous. | Insol. | 100 | I | 1,710 | ---------- | 250 | 64 | 100 | 125 |
| 11 | ECH:EO:AGE—13:80:7 | Very tough rubber. | Moderate | 64 | 100 | I<br>II | 3,400<br>2,160 | 2,060<br>915 | 530<br>820 | 86<br>80 | 97<br>97 | 180<br>400 |
| 12 | ECH:PO:AGE—43:48:9 | Snappy rubber. | Amorphous. | Insol. | 70 | I | 2,710 | 1,140 | 530 | 59 | 99 | 280 |
| 13 | ECH:PO:AGE—68:22:10 | Tough rubber. | Largely amorphous. | Insol. | 72 | I | 2,770 | 2,660 | 310 | 67 | 100 | 195 |
| 14 | ECH:PO:AGE—13:77:10 | do | do | Insol. | 100 | I | 1,960 | 740 | 710 | 52 | 98 | 560 |
| 15 | ECH:EO:PO:AGE—8:76:18:10 | do | do | 86 | 100 | I<br>II | 3,090<br>1,580 | 1,800<br>755 | 540<br>730 | 78<br>73 | 98<br>88 | 230<br>590 |

EXAMPLE 16

Epichlorohydrin (9 parts) was copolymerized with glycidyl methacrylate (1 part) using the general procedure described in Example 1. The catalyst used was that prepared by reacting an 0.5 M solution of triethylaluminum in 70:30 n-heptane:diethyl ether with 1 mole of acetylacetone per mole of triethylaluminum and then with 0.5 mole of water per mole of aluminum, the amount of this catalyst solution used being that equal to 0.46 part of triethylaluminum. The total diluent amounted to 86 parts of which 92% was toluene, 5% diethyl ether, and the remainder n-heptane. The polymerization reaction was carried out for 48 hours at 30° C. The polymerization reaction was stopped and the copolymer was isolated by diluting the reaction mixture with ether, collecting the ether-insoluble polymer, slurrying it with a 1% solution of hydrogen chloride in ethanol, again collecting and washing it with methanol until neutral and finally with a 0.4% solution of Santonox in methanol, after which it was dried. The epichlorohydrin-glycidyl methacrylate copolymer so obtained was a tough rubbery polymer, insoluble in ether. It had an RSV of >0.1 as measured in α-chloronaphthalene at 100° C. It contained 15% glycidyl methacrylate based on chlorine analysis and X-ray showed it to be largely amorphous.

This application is a continuation-in-part of my application U.S. Serial No. 738,627 filed May 29, 1958, and of my application U.S. Serial No. 812,079, filed May 11, 1959, which is, in turn, a continuation-in-part of my application U.S. Serial No. 738,626, filed May 29, 1958.

What I claim and desire to protect by Letters Patent is:

1. A solid copolymer of an epihalohydrin and at least one other epoxide, at least one of which said other epoxide is an ethylenically unsaturated epoxide selected from the group consisting of ethylenically unsaturated glycidyl ethers and monoepoxides of polyenes, said copolymer being essentially a linear polyether having repeating units derived only from said epihalohydrin and epoxides, and having a reduced specific viscosity of at least about 0.2 when measured as a 0.1% solution in α-chloronaphthalene at 100° C., said copolymer containing at least about 5% by weight of repeating units derived from epihalohydrin and at least about 0.5% by weight of repeating units derived from said ethylenically unsaturated epoxides.

2. The composition of claim 1 wherein the polyether is a copolymer of an epihalohydrin and a glycidyl ether having the formula

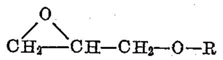

where R is an ethylenically unsaturated group.

3. The composition of claim 1 wherein the polyether is a copolymer of an epihalohydrin and a monoepoxide of a diene.

4. The composition of claim 2 wherein the polyether is a copolymer of an epihalohydrin, an alkylene oxide, and a glycidyl ether having the formula

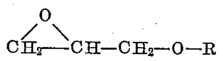

where R is an ethylenically unsaturated group.

5. The polyether of claim 2 wherein the epihalohydrin is epichlorohydrin.

6. The polyether of claim 3 wherein the epihalohydrin is epichlorohydrin.

7. The polyether of claim 4 wherein the epihalohydrin is epichlorohydrin.

8. A polyether copolymer of epichlorohydrin and allyl glycidyl ether having a Reduced Specific Viscosity of at least about 0.2 when measured as a 0.1% solution in α-chloronaphthalene at 100° C., and containing from about 99.5% to about 5% by weight of epichlorohydrin and from about 0.5% to about 95% of allyl glycidyl ether.

9. A polyether copolymer of epichlorohydrin and o-allylphenyl glycidyl ether having a Reduced Specific Viscosity of at least about 0.2 when measured as a 0.1% solution in α-chloronaphthalene at 100° C., and containing from about 99.5% to about 5% by weight of epichlorohydrin and from about 0.5% to about 95% by weight of o-allylphenyl glycidyl ether.

10. A polyether copolymer of epichlorohydrin and butadiene monoxide having a Reduced Specific Viscosity of at least about 0.2 when measured as a 0.1% solution in α-chloronaphthalene at 100° C., and containing from about 99.5% to about 5% by weight of epichlorohydrin and from about 0.5% to about 95% by weight of butadiene monoxide.

11. A polyether copolymer of epichlorohydrin, ethylene oxide and allyl glycidyl ether having a Reduced Specific Viscosity of at least about 0.2 when measured as a 0.1% solution in α-chloronaphthalene at 100° C., and containing at least about 5% by weight of epichlorohydrin and at least about 0.5% by weight of allyl glycidyl ether.

12. A polyether copolymer of epichlorohydrin, propylene oxide, and allyl glycidyl ether having a Reduced Specific Viscosity of at least about 0.2 when measured as a 0.1% solution in α-chloronaphthalene at 100° C., and containing at least about 5% by weight of epichlorohydrin and at least about 0.5% by weight of allyl glycidyl ether.

References Cited in the file of this patent

UNITED STATES PATENTS 2,470,324 Staudinger et al. ________ May 17, 1949
2,476,922 Shokal et al. ____________ July 19, 1949

OTHER REFERENCES

Adams et al.: Journal of Polymer Science, volume 9, pages 481–492 (1952).